(12) United States Patent
Casarola et al.

(10) Patent No.: US 11,395,475 B2
(45) Date of Patent: Jul. 26, 2022

(54) STALLING CAGE FOR MONITORING THE CONSUMPTION OF LIQUIDS

(71) Applicant: AM MICROSYSTEMS SRL, Urbisaglia (IT)

(72) Inventors: Fabio Casarola, Filottrano (IT); Roberto Ciccocioppo, Camerino (IT); Adolfo Russo, Macerata (IT); Matteo Piersantelli, Macerata (IT)

(*) Notice: Subject to any disclaimer, the term of this patent is extended or adjusted under 35 U.S.C. 154(b) by 72 days.

(21) Appl. No.: 17/254,820

(22) PCT Filed: Jun. 21, 2019

(86) PCT No.: PCT/EP2019/066453
§ 371 (c)(1),
(2) Date: Dec. 21, 2020

(87) PCT Pub. No.: WO2020/002145
PCT Pub. Date: Jan. 2, 2020

(65) Prior Publication Data
US 2021/0259200 A1 Aug. 26, 2021

(30) Foreign Application Priority Data
Jun. 25, 2018 (IT) .......................... 102018000006637

(51) Int. Cl.
*A01K 1/03* (2006.01)
*A01K 7/02* (2006.01)
*A01K 1/035* (2006.01)

(52) U.S. Cl.
CPC ............ *A01K 1/031* (2013.01); *A01K 1/0356* (2013.01); *A01K 7/02* (2013.01)

(58) Field of Classification Search
CPC ......... A01K 1/031; A01K 7/02; A01K 1/0356
See application file for complete search history.

(56) References Cited

U.S. PATENT DOCUMENTS 6,490,920 B1  12/2002  Netzer

FOREIGN PATENT DOCUMENTS

| CN | 206821612 U | 1/2018 |
| WO | 2016042459 A1 | 3/2016 |

OTHER PUBLICATIONS

International Search Report for corresponding PCT/EP2019/066453, dated Sep. 19, 2019.
Written Opinion of the International Searching Authority for corresponding PCT/EP2019/066453, dated Sep. 19, 2019.

*Primary Examiner* — Timothy D Collins
*Assistant Examiner* — Nicholas Leo Seneczko
(74) *Attorney, Agent, or Firm* — Egbert, McDaniel & Swartz, PLLC

(57) ABSTRACT

A stalling cage having a box suitable for containing an animal, a receptacle that contains a liquid to be administered to the animal in the box, and a monitoring device suitable for continuously monitoring the consumption of liquid from the receptacle. The monitoring device has a level condenser with two electrodes in co-planar configuration in contact with the receptacle in order to measure the capacitance variation caused by the variation of the level of liquid relative to the air in the receptacle.

9 Claims, 6 Drawing Sheets

STALLING CAGE FOR MONITORING THE CONSUMPTION OF LIQUIDS

The present invention relates to a device comprising a receptacle and a cage that is used to monitor the activity of animals.

The monitoring of the consumption of low-viscosity liquids by an animal, which can also act as guinea pig, is very important to assess its behavior. Such a monitoring is especially important in case of abuse of substances like alcohol, and also for the study of diseases such as diabetes, with the use of saccharin and artificial sweeteners in the monitored liquid.

The purpose of the monitoring is to standardize and improve the quality of the data obtained by the investigation centers.

The monitoring of the consumption of liquids in animals, including mice, is currently performed by means of tests that are made in the laboratory with special machines. In fact, in order to make the tests, the animals are moved from their habitat, which they consider as their home cage and which is positioned on a dedicated shelf.

Therefore, the animals are taken to a new habitat that is not recognized as familiar (for example, rodents are very sensitive to changes of the reference points they have memorized). This fact extends the duration of the test and adds an adjustment step and an exploration time that is needed by the animal in order to become familiar with the space. Moreover, the stress suffered by the animals can distort the result of the experiment, especially for what regards alcohol abuse, in which anxiety, depression and stress are fundamental parameters.

Furthermore, the laboratory machines are expensive, cumbersome and complicated. As a matter of fact, laboratory machines are connected by cable to a PC where a dedicated software is installed to process the monitoring data.

The stalling cages of the prior art are generally provided with receptacles of liquids for the animals during stalling, but are not provided with any system to monitor the consumption of liquids. The most advanced models of stalling cages are provided with an infrared sensor for detecting when the liquid is about to finish. Such an infrared sensor is connected to an alarm in order to inform when the liquid is about to finish and refill the receptacle.

CN206821612 discloses a stalling cage that comprises a primary box suitable for containing one or more animals, and a secondary box that comprises a bottle that contains the liquid to be administered to the animals in the primary box. The bottle of liquid comprises a liquid level sensor in order to detect the level of liquid in the bottle. The level sensor comprises a cylindrical metal body of the bottle and a metal element that are the two poles of a capacitor. However, CN206821612 is impaired by the fact that the bottle of liquid cannot be rapidly and easily separated from the level sensor because the level sensor is inside the bottle of liquid. In view of the above, the bottle of liquid cannot be sterilized.

US2011/0011527 discloses a food monitoring system of animals in a cage that comprises a cage with a trough that can be accessed from the cage and contains the food. Sensors, such as capacitive sensors, are provided under the trough to detect a variation in the weight of the trough. However, US2011/0011527 discloses a monitoring system for solid food, and not for liquids.

WO2016/042459 and US6490920 disclose a sensor used to measure the fuel level in a tank, but they do not refer to the field of stalling cages.

The purpose of the present invention is to eliminate the drawbacks of the prior art by disclosing a stalling cage that is suitable for monitoring the consumption of liquids by the animals in the cage, and wherein it is possible to separate a level sensor from a receptacle of liquids, rapidly and easily, in order to sterilize the receptacle of liquids.

Another purpose of the present invention is to disclose such a stalling cage that is capable of remotely transmitting the monitoring data on the consumption of liquids.

Another purpose of the present invention is to disclose such a stalling cage that represents a natural habitat for the animals, avoiding the need to take the animals to the laboratory to test the consumption of liquids.

Another purpose of the present invention is to disclose such a stalling cage that is suitable for continuously detecting the consumption of liquids, eliminating human errors, and the stress caused to the animals that do not need to be transferred to a new habitat for monitoring purposes.

Another purpose of the present invention is to provide such a stalling cage that is versatile, efficient, practical, inexpensive, not cumbersome and easy to make and use.

These purposes are achieved according to the invention with the characteristics of the independent claim 1.

Advantageous embodiments of the invention appear from the dependent claims.

The stalling cage of the invention is defined by the independent claim 1.

The stalling cage of the invention comprises:
- a box suitable for containing one or more animals
- a receptacle that contains a liquid to be administered to the animals in the box, and
- a monitoring device composed of a casing and a flexible printed circuit board (PCB) suitable for continuously monitoring the consumption of liquid from the receptacle.

The monitoring device measures the capacitance variation caused by the variation of the level of liquid relative to the air inside the receptacle, using a level condenser with two electrodes in co-planar configuration disposed in contact with the receptacle and outside the receptacle.

The monitoring device comprises a half-shell with a base wall, a back wall, two lateral walls and a shelf that projects from the back wall of the half-shell and is disposed inside the half-shell in proximal parallel position relative to the base wall, in such a way to form a space between the base wall and the shelf.

The two electrodes of the level condenser are mounted on the half-shell and the receptacle is removably inserted in the half-shell.

The PCB (4) comprises a first side that faces the receptacle and a second side that faces the half-shell. The PCB comprises:
- a lower portion that is disposed in the space between the base wall and the shelf of the half-shell;
- a back portion that is disposed on the back part of the half-shell;
- and a side portion that is disposed on a lateral wall of the half-shell.

The electrodes of the level condenser are disposed on the first side of the lateral portion of the PCB.

Because of this configuration, the monitoring device can measure different types of liquids, without coming in contact with them.

In view of the above, the receptacle can be sterilized. Since the monitoring device is removably applied to the receptacle, the receptacle can be always sterilized.

Additionally, the monitoring device has a low energy consumption and can be powered with batteries.

The monitoring device also comprises an analogue-digital converter that converts the analogue capacitance signal detected by the level condenser into a digital signal.

Advantageously, the monitoring device also comprises a microprocessor connected to the converter and to a wireless communication module in order to send the digital signal that comes out of the converter to a PC or Smart Device provided with a wireless communication module.

The pre-clinic experimentation is based on in vivo tests that can last for several days, in which several parameters of the experiment are monitored. For this reason, the monitoring device of the stalling cage is suitable for updating the data in real time and can be accessed and programmed also from remote by means of the wireless communication module.

In order to eliminate the outdoor noise (operator presence, animal presence, humidity variation, temperature variation, etc.), in addition to the level condenser, also a reference condenser and at least one shield condenser are provided.

Additional features of the invention will appear manifest from the following detailed description, which refers to a merely illustrative, not limiting embodiment, as illustrated in the appended figures, wherein.

Figure 1:
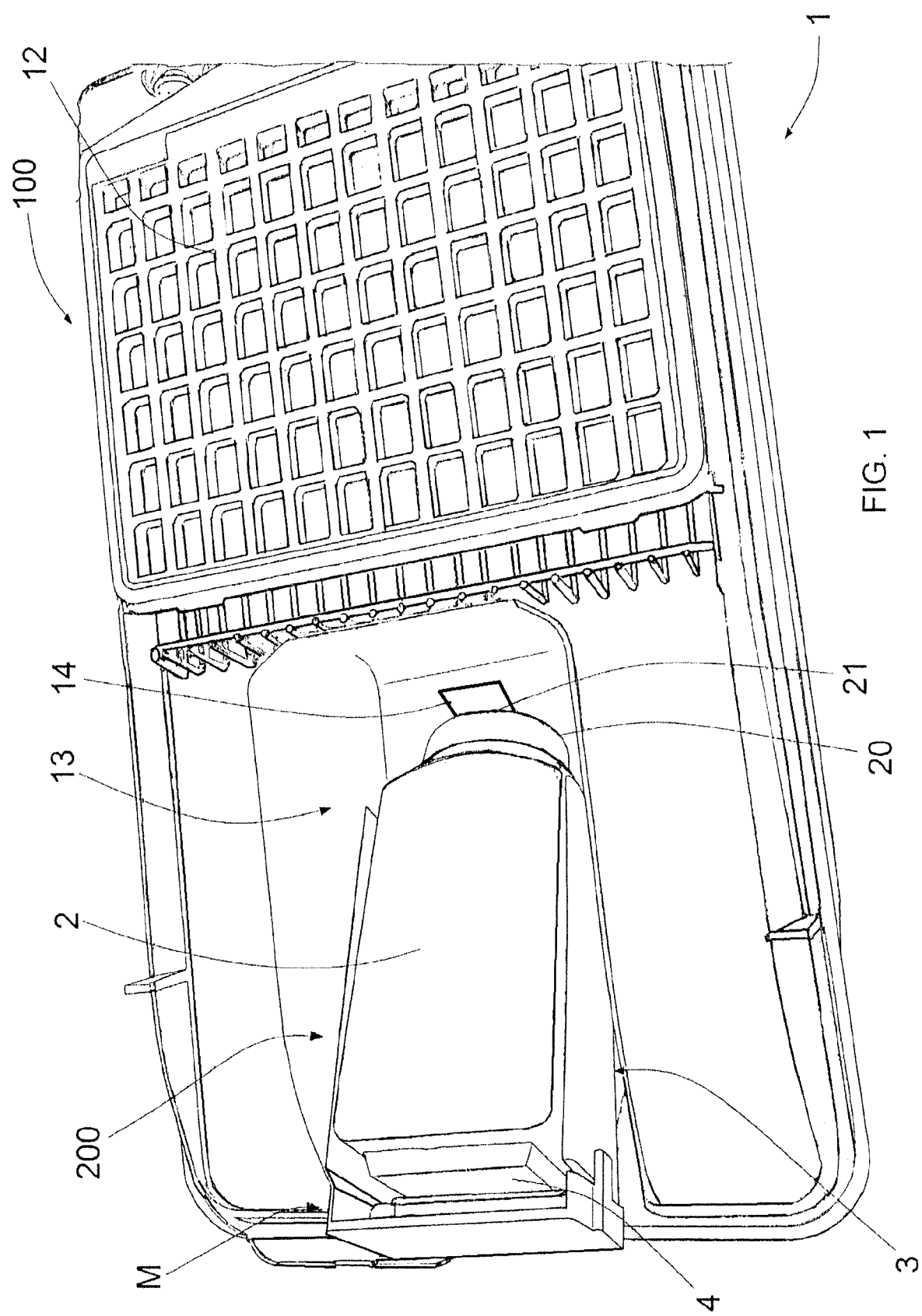
FIG. 1 is a top perspective view of the monitoring device applied to a stalling cage according to the invention.

With reference to the aforementioned Figures, the stalling cage of the invention, which is generally indicated with reference numeral (100), is described. The stalling cage (100) comprises a detection system (200) suitable for detecting a consumption of liquids.

Figure 2:
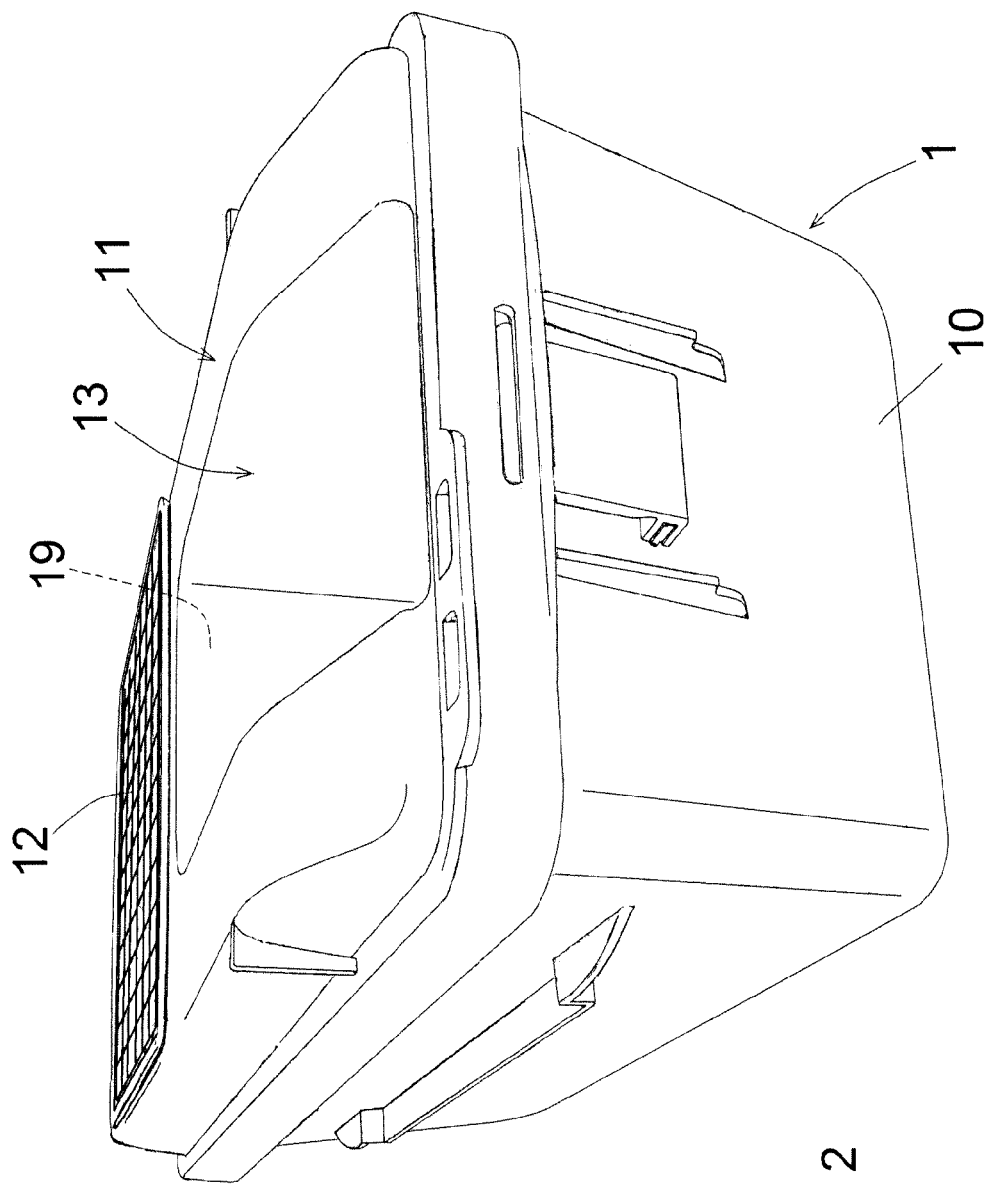
FIG. 2 is an exploded perspective view of a monitoring device coupled with a receptacle of liquids and the box of the stalling cage of FIG. 1.
Figure 3:
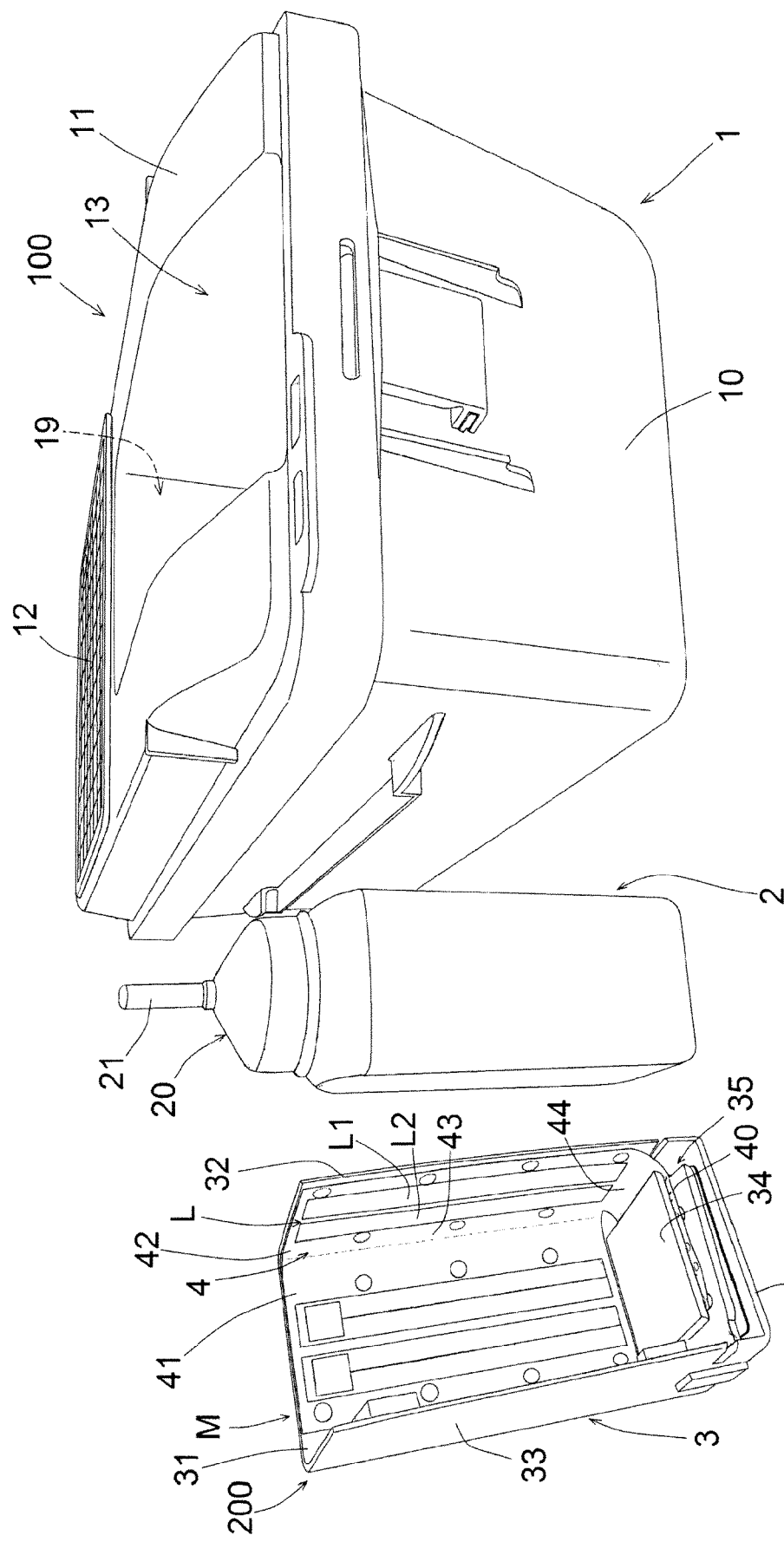
FIG. 3 is the same view as FIG. 2, in which the receptacle of liquids is extracted from the monitoring device.

With reference to FIGS. 1, 2 and 3, the stalling cage (100) comprises a box (1) suitable for containing one or more animals. The box (1) comprises a tub (10) and a lid (11). A grille-like door (12) is hinged in the lid. A metal grille (19) for the food is provided in the lid (11) under the door (12).

The lid (11) is provided with a recessed housing (13) that is open on top in order to receive a receptacle (2) that contains a liquid to be administered to the animals. The receptacle (2) has a parallelepiped body with square or rectangular section. The body of the receptacle (2) is made of plastic or glass. The receptacle comprises a head (20) that is shaped as a funnel and is provided with a nozzle (21) suitable for administering the liquid.

The receptacle (2) is disposed in the housing (13) of the lid of the stalling cage, in such a way that the nozzle (21) is inserted in an opening (14) of the lid, passing through a wall of the lid in order to be disposed inside the stalling cage. In view of the above, the animals in the stalling cage (100) can access the nozzle (21) and lick the liquid contained in the receptacle (2).

According to the invention, the receptacle (2) is removably coupled with a monitoring device (M) suitable for continuously monitoring the consumption of liquid inside the receptacle (2). The detection system (200) comprises the receptacle (2) and the monitoring device (M).

The monitoring device (M) comprises a half-shell (3) with parallelepiped shape that is suitable for containing the receptacle (2). The half-shell (3) comprises a base wall (30), a back wall (31) and two lateral walls (32, 33). A shelf (34) protrudes from the back wall (31) of the half-shell and is disposed inside the half-shell (3) in proximal parallel position to the base wall (30). In view of the above, a space (35) is generated between the base wall (30) and the shelf (34).

With reference to FIG. 3, a flexible printed circuit board (PCB) (4) is disposed in the half-shell (3). The PCB (4) comprises:

a lower portion (40) that is disposed in the space (35) between the base wall (30) and the shelf (34) of the half-shell;

a back portion (41) that is disposed on the back part (31) of the half-shell; and and a side portion (42) that is disposed on a lateral wall (32) of the half-shell.

The PCB (4) can be of flexible type. So, the side portion (42) is folded by 90° relative to the back portion (41) along a first folding line (43) and the lower portion (40) is folded by 90° relative to the side portion (42) along a second folding line (44).

Obviously, the PCB (4) can be of rigid type. In such a case, the three portions (40, 41, 42) of the PCB are three physically separated parts provided with conductive tracks. The conductive tracks are connected by means of electrical connections, such as cables.

Figure 4:
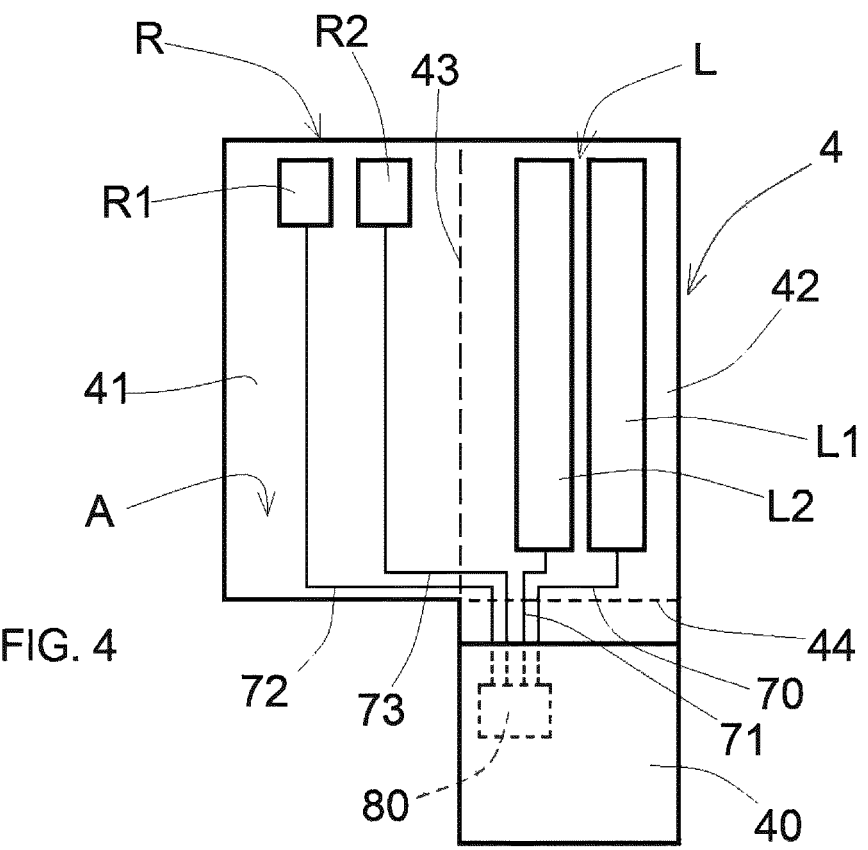
FIG. 4 is a top view of a PCB of the monitoring device in extended planar condition.
Figure 5:
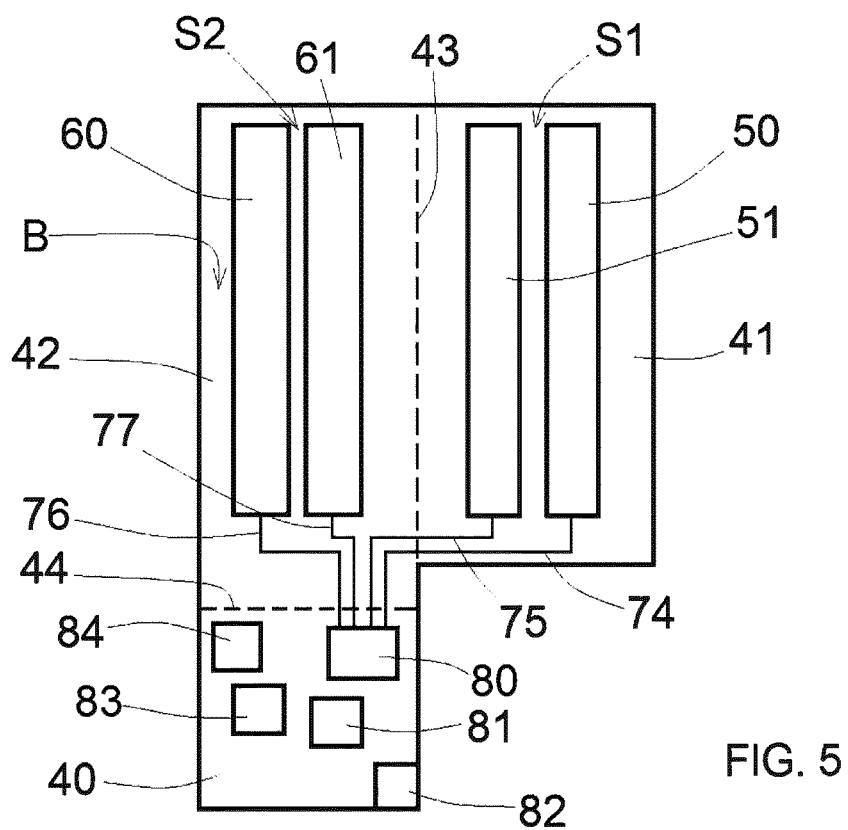
FIG. 5 is a bottom view of the PCB of FIG. 4.

With reference to FIGS. 4 and 5, the PCB (4) is of double-side type and comprises a first side (A) (FIG. 4) suitable for being directed towards the receptacle (2), and a second side (B) (FIG. 5) suitable for being directed towards the half-shell (3). The PCB (4) provides for electrical components that are mounted both on the first side (A) and on the second side (B).

With reference to FIG. 4, a level condenser (L) is obtained on the first side (A) of the side portion (42) of the PCB. The level condenser (L) comprises two electrodes (L1, L2) in co-planar and parallel position.

Each electrode (L1, L2) is a strip of conductive material, such as copper, deposited on the upper side of the side portion (42) of the PCB.

Each electrode (L1, L2) extends for a length that is slightly lower than the length of the side portion (42) of the PCB. When the receptacle (2) is disposed in the half-shell (3), the electrodes of the level condenser (L) are in contact with a lateral wall of the receptacle (2) for the entire length of the lateral wall of the receptacle in order to measure the capacitance of the liquid and of the air in the receptacle. While the liquid is progressively consumed, the quantity of air in the receptacle increases and therefore the capacitance measured by the level condenser (L) varies.

Each electrode (L1, L2) has a width that is equal to approximately ¹⁄₁₀ of the length. The two electrodes (L1, L2) are spaced by a distance that is equal to approximately ½ of the width of the electrode.

A reference condenser (R) is obtained on the first side (A) of the back portion (42) of the PCB. Said reference condenser (R) is used to eliminate the undesired outdoor noise. The reference condenser (R) comprises two electrodes (R1, R2).

Each electrode (R1, R2) of the reference condenser is a strip of conductive material, such as copper, deposited on the upper side of the back portion (41) of the PCB.

Each electrode (R1, R2) of the reference condenser has a basically square shape and is disposed in an upper portion of the back portion (41) of the PCB. When the receptacle (2) is disposed in the half-shell (3), the electrodes of the reference condenser (L) are in contact with an upper part of a back wall of the receptacle.

The length of each electrode (R1, R2) of the reference condenser is 1/10 of the length of the electrode of the level condenser. Each electrode (R1, R2) of the reference condenser has a width that is equal to the length. The two electrodes (R1, R2) of the reference condenser are spaced by a distance that is equal to approximately 1/2 of the width of the electrode.

With reference to FIG. 5, a first shield condenser (S1) and a second shield condenser (S2) are provided on the second side (B) of the PCB in order to shield the undesired noise.

The first shield condenser (S1) is disposed in the side portion (42) of the PCB. The second shield condenser (S2) is disposed in the back portion (41) of the PCB. Each shield condenser (S1; S2) has two electrodes (50, 51; 60, 61) that have basically the same shape, dimensions and materials as the electrodes (L1, L2) of the level condenser.

Each electrode (L1, L2, R1, R2, 50, 51, 60, 61) of the condensers (L, R, S1, S2) is connected to an analogue-digital converter (80) by means of tracks (70, 71, 72, 73, 74, 75, 76, 77) obtained on the first side (A) and on the second side (B) of the PCB. The converter (80) is mounted on the second side (B) of the lower portion (40) of the PCB.

Figure 6:
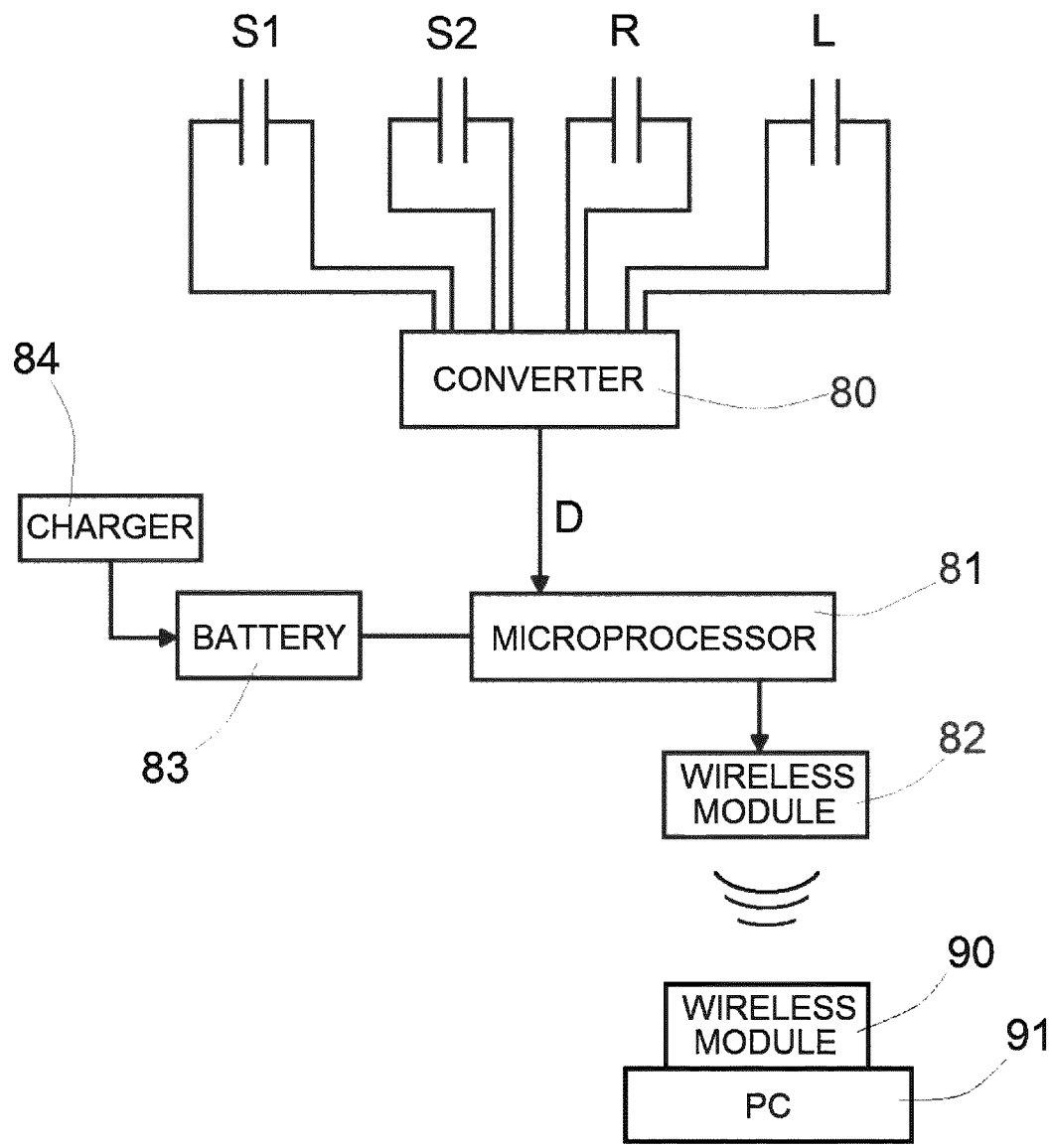
FIG. 6 is an electric block diagram that diagrammatically shows the operation of the monitoring device.

With reference to FIG. 6, the converter (80) converts the analogue capacitance signal detected by the level condenser (L) into a digital signal (D). The digital capacitance signal (D) varies when the amount of liquid contained in the receptacle (2) varies. Therefore, according to said measurement, the amount of liquid consumed by the animals can be continuously detected.

The converter (80) can have three additional inputs for the reference condenser (R) and the two shield condensers (S1, S2) in such a way to eliminate the interference on the capacitance measurement made by the level condenser (L).

For instance, the converter (80) can be a 4-channel capacitance-to-digital converter that is produced and marketed by Texas Instruments with the name of FDC1004. Such a type of measurement technique is disclosed in the US20160003663A1 patent application and therefore its detailed description is omitted.

The converter (80) is connected by means of a microprocessor (81) to a wireless communication module (82) that is suitable for remotely transmitting the digital signal (D) emitted by the converter (80). The wireless communication module (82) can be coupled with another wireless communication module (90) connected to a PC or Smart Device (91) in order to download the digital data from the converter (80). For instance, the wireless communication module (82) can be a Bluetooth communication module.

A battery (83) is mounted on the PCB (4) and is connected to the microprocessor (81) in order to supply the electrical components that need to be powered. Also a charger (84) suitable for charging the battery is mounted on the PCB (4). Advantageously, said charger (84) is a wireless charger to simplify the cleaning and sanitization operations of the monitoring device (M) after use.

The converter (80), the microprocessor (81), the wireless communication module (82), the battery (83) and the charger (84) are mounted on the second side (B) of the lower portion (40) of the PCB. In view of the above, said electrical components (80, 81, 82, 83, 84) are protected in the space (35).

Advantageously, the advantage of the capacitance measurement made by the monitoring device (M) is that the signal is not only indicative of the level of the consumed liquid, but also of the drinking activity of the animals (licking micro-analysis) and indirectly also of the activity in the stalling cage (100), thus simplifying the recognition of the Circadian (day-night) cycle.

Figure 7:
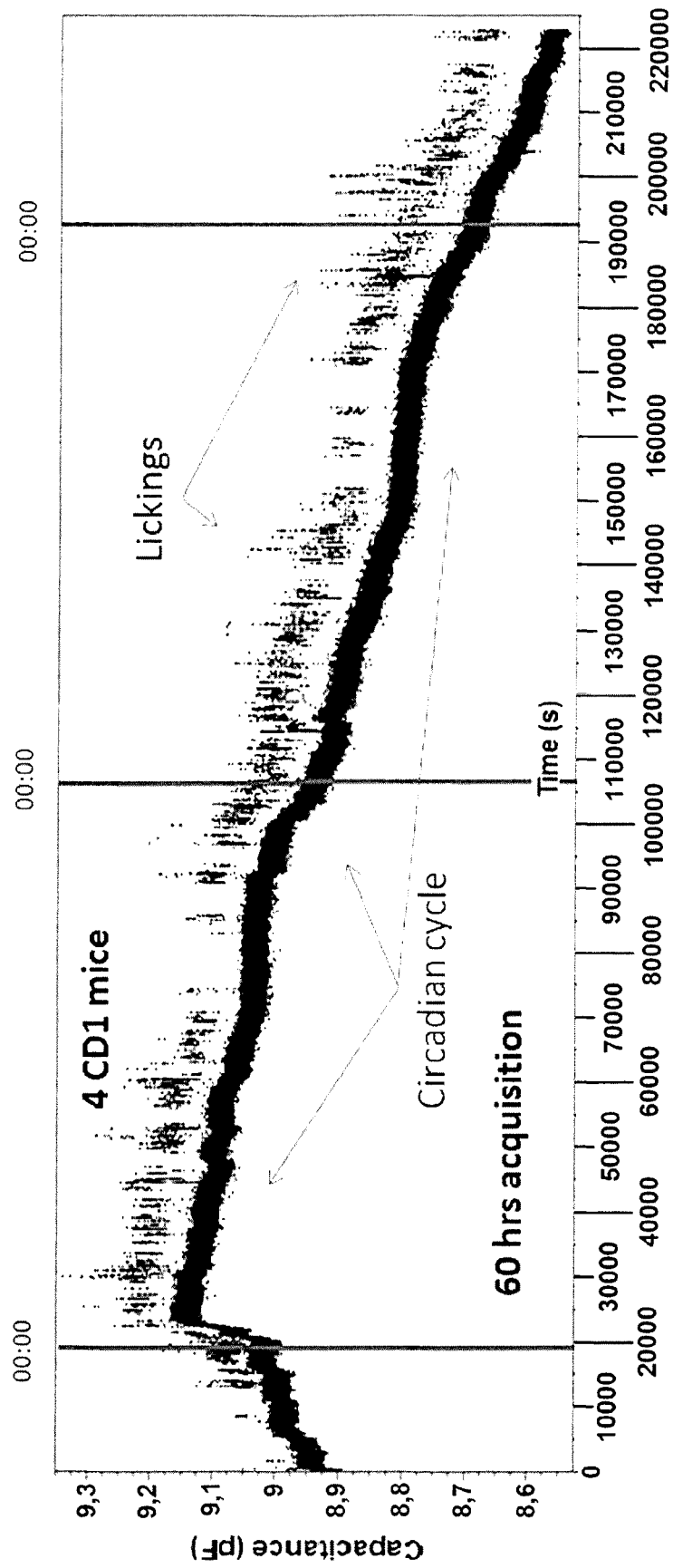
FIG. 7 is a chart that shows the variation of the capacitance signal detected by the monitoring device of the stalling cage according to the present invention during a 60-hour prolonged acquisition.

FIG. 7 shows a graph of the capacitance signal (expressed in picofarads) upon a variation of the time (expressed in seconds) that is obtained from a prolonged acquisition (60 hours) with the monitoring device (M) in a stalling cage (100) with four mice. The graph shows the activity cycles and the number of lickings.

The head (20) of the receptacle is removably mounted in the receptacle and is generally made of metal. However, in order to improve the licking detection and perform a licking micro-analysis, a second head made of insulating material is provided, which can replace the head (20) of metal material. During the reading of the capacitance value by the monitoring device, the head made of insulating material avoids the introduction of the noise that is caused when the feet of the animals touch the head of the receptacle, thus permitting a more detailed licking analysis.

The signal in picofarad (pF) detected by the monitoring device (M) can be converted in milliliters (ml) of consumed liquid with a suitable conversion algorithm.

Numerous equivalent variations and modifications can be made to the present embodiment of the invention, which are within the reach of an expert of the field, falling in any case within the scope of the invention as disclosed by the attached claims.

The invention claimed is:

1. Stalling cage comprising:
a box suitable for containing one or more animals;
a receptacle that contains a liquid to be administered to the animals in the box, and
a monitoring device suitable for continuously monitoring the consumption of liquid from the receptacle;
wherein the monitoring device comprises a level condenser with two electrodes disposed in contact with the receptacle in order to measure the capacitance variation caused by the variation of the level of liquid relative to the air in the receptacle;
wherein the monitoring device comprises a half-shell with a base wall, a back wall and two lateral walls,
characterized in that
the electrodes are in co-planar configuration and are disposed outside the receptacle;
said two electrodes of the level condenser are mounted on the half-shell;
wherein said receptacle is removably inserted in said half-shell; the half-shell contains a flexible printed circuit board (PCB), said half-shell comprises a shelf that projects from the back wall of the half-shell and is disposed inside the half-shell in proximal parallel position relative to the base wall, in such a way to form a space between the base wall and the shelf;
said PCB comprises a first side that faces the receptacle and a second side that faces the half-shell;
said PCB comprises:
a lower portion that is disposed in the space between the base wall and the shelf of the half-shell;
a back portion that is disposed on the back part of the half-shell; and a side portion that is disposed on a lateral wall of the half-shell;

said electrodes of the level condenser being disposed in a first side of the lateral portion of the PCB.

2. The stalling cage of claim 1, wherein the monitoring device also comprises an analogue-digital converter that converts the analogue capacitance signal detected by the level condenser into a digital signal.

3. The stalling cage claim 2, wherein the monitoring device also comprises a microprocessor connected to the converter and to a wireless communication module in order to send the digital signal that comes out of the converter to a PC or Smart Device provided with a wireless communication module.

4. The stalling cage of claim 1, wherein the monitoring device also comprises a battery to power the electrical components of the monitoring device that need to be powered.

5. The stalling cage of claim 4, wherein the monitoring device also comprises a wireless charger to charge said battery in wireless mode.

6. The stalling cage of claim 1, wherein the monitoring device also comprises a reference condenser and at least one shield condenser to eliminate the noise introduced from the outdoor environment.

7. The stalling cage of claim 6, wherein said reference condenser comprises two electrodes disposed on a first side of the back portion of the PCB;

said at least one shield condenser comprises a first shield condenser with two electrodes disposed on a second side of the back portion of the PCB, and a second shield condenser with two electrodes disposed on a second side of the lateral portion of the PCB.

8. The stalling cage of claim 7, wherein:

each electrode of the level condenser has a width equal to $1/10$ of the length and the two electrodes of the level condenser are spaced by a distance that is equal to approximately $1/2$ of the width of the electrode;

each electrode of the reference condenser has a basically square shape, with a length that is equal to $1/10$ of the length of the electrode of the level condenser;

each electrode of the reference condenser has a width that is equal to the length and the two electrodes of the reference condenser are spaced by a distance that is equal to approximately $1/2$ of the width of the electrode;

each shield condenser has two electrodes that have identical dimensions and are made of identical materials as the electrodes of the level condenser.

9. The stalling cage of claim 1, wherein said receptacle comprises a head provided with a nozzle that can be removably applied to the receptacle, wherein said head is made of metallic material and the detection system also comprises a second head made of insulating material, which can replace the head made of metallic material in order to perform a micro-analysis of the lickings made by the animals.

* * * * *